United States Patent
Slobodan et al.

(10) Patent No.: US 10,775,344 B2
(45) Date of Patent: Sep. 15, 2020

(54) ELECTROPHORESIS SYSTEM WITH MODULAR PEDESTALS

(71) Applicant: Coastal Genomics Inc., Burnaby (CA)

(72) Inventors: Jared Slobodan, Richmond (CA); Darren Cheng, Vancouver (CA); Kevin Baillie, Vancouver (CA); Andrew Nobles, Vancouver (CA); Matthew Nesbitt, Langley (CA)

(73) Assignee: Coastal Genomics Inc., Burnaby, British Columbia (CA)

( * ) Notice: Subject to any disclaimer, the term of this patent is extended or adjusted under 35 U.S.C. 154(b) by 298 days.

(21) Appl. No.: 15/120,704

(22) PCT Filed: Feb. 24, 2015

(86) PCT No.: PCT/CA2015/050139
§ 371 (c)(1),
(2) Date: Aug. 22, 2016

(87) PCT Pub. No.: WO2015/123786
PCT Pub. Date: Aug. 27, 2015

(65) Prior Publication Data
US 2017/0010239 A1    Jan. 12, 2017

Related U.S. Application Data

(60) Provisional application No. 61/944,051, filed on Feb. 24, 2014.

(51) Int. Cl.
*G01N 27/447* (2006.01)
(52) U.S. Cl.
CPC .............................. *G01N 27/44713* (2013.01)

(58) Field of Classification Search
CPC ........... G01N 27/447; G01N 27/44704; G01N 27/44713; G01N 27/44756
See application file for complete search history.

(56) References Cited

U.S. PATENT DOCUMENTS 5,328,581 A    7/1994  Sorge
6,132,582 A *  10/2000 King ................. G01N 27/44743
                                                   204/453

(Continued)

FOREIGN PATENT DOCUMENTS

DE    2708255 A1   8/1978
EP    0631132 A2   12/1994

(Continued)

OTHER PUBLICATIONS

European Patent Office, Extended European Search Report, Application No. 15751875, dated Nov. 15, 2017.

(Continued)

*Primary Examiner* — Bethany L Martin
(74) *Attorney, Agent, or Firm* — Quarles & Brady LLP

(57) ABSTRACT

There is provided a method for distributing power in an electrophoresis system from a power supply to each channel of an interfaced cassette connected to a pedestal located on the electrophoresis system, the method comprising: receiving a power signal from the power supply at the pedestal; receiving at least one externally generated control signal; and, modulating the power signal at a processor electrically coupled to the pedestal in dependence upon the control signal to generate a modulated power signal defined for each said cassette channel of the pedestal.

21 Claims, 12 Drawing Sheets

(56) References Cited

U.S. PATENT DOCUMENTS

| | | | |
|---|---|---|---|
| 6,491,805 B1 | | 12/2002 | Gordon et al. |
| 64,918,058 | | 12/2002 | Gordon et al. |
| 6,592,820 B1 | * | 7/2003 | Hardman .............. G01N 27/745 |
| | | | 422/561 |
| 6,682,641 B1 | | 1/2004 | Finney et al. |
| 6,764,648 B1 | | 7/2004 | Roach et al. |
| 8,652,316 B1 | | 2/2014 | Chuu et al. |
| 2002/0086416 A1 | * | 7/2002 | Sato ..................... C12Q 1/6825 |
| | | | 435/287.2 |
| 2004/0050699 A1 | | 3/2004 | Goncalves |
| 2005/0217997 A1 | * | 10/2005 | Goncalves ....... G01N 27/44773 |
| | | | 204/616 |
| 2012/0241322 A1 | * | 9/2012 | Shiraki ............ G01N 27/44791 |
| | | | 204/452 |
| 2013/0115607 A1 | * | 5/2013 | Nielsen ................... C12Q 1/68 |
| | | | 435/6.12 |
| 2013/0127814 A1 | | 5/2013 | Lee |
| 2015/0014168 A1 | * | 1/2015 | Kinoshita ........ G01N 27/44713 |
| | | | 204/457 |

FOREIGN PATENT DOCUMENTS

| | | |
|---|---|---|
| WO | 02077629 A1 | 10/2002 |
| WO | 02077630 A1 | 10/2002 |

OTHER PUBLICATIONS

The International Search Report and Written Opinion as dated May 8, 2015 for International Application No. PCT/CA2015/050139.

* cited by examiner

ELECTROPHORESIS SYSTEM WITH MODULAR PEDESTALS

CROSS REFERENCE TO PRIOR APPLICATIONS

This application represents the national stage entry of PCT International Application No. PCT/CA2015/050139 filed on Feb. 4, 2015 and claims priority to U.S. Provisional Patent Application 61/944,051, which is incorporated herein by reference.

FIELD OF THE INVENTION

The invention relates generally to electrophoresis systems and more particularly to modular pedestals located on such electrophoresis systems.

BACKGROUND OF THE INVENTION

Currently, a variety of electrophoresis systems exist in the art which are used for sorting and separating macromolecules (e.g. DNA, RNA and proteins) based on their size and electric charge. Electrophoresis typically refers to the force (e.g. electromotive force) applied to move molecules through a gel matrix. These systems typically utilize an electrophoresis tank, a UV trans-illuminator and/or an LED trans-illuminator for visualization and imaging. Typically in such electrophoresis systems, a gel matrix (e.g., agarose or polyacrylamide) is used to separate the macromolecules by size. Typically, the gel is placed in a gel chamber and an electrical field is applied to the gel chamber via an external power supply which provides an electric current. The electric field causes macromolecules loaded in the gel to separate based on various parameters such as their size, the density of the gel, the voltage of the power supply. Typically, the electric field comprises opposing charges at opposite ends of the gel chamber containing the gel. That is, the electric field consists of a negative charge at one end which pushes the molecules through the gel, and a positive charge at the other end that pulls the molecules through the gel.

The external power supply typically connects to the electrophoresis chamber and provides an electric field between two electrodes. The external power supply is then manually controlled to allow a user to set the output voltage for different size chamber or gel tanks and adjust the voltage for desired result.

The scalability and control of the electrophoresis systems in existing systems is cumbersome and requires multiple separate units (e.g. external power supply), which increase cost and space requirements. Present electrophoresis systems are generally not intended to be integrated. In cases where partial integration is possible, electrophoresis systems require external power sources when integrating with high throughput automated systems, such as robotic liquid handling machines.

Furthermore, electrophoretic power supplies generally supply a single voltage level that is applied globally to a single gel chamber. That is, in existing systems no ability exists to provide different (e.g. multiple) voltage levels to discrete gel chambers, which is desirable to control the electrophoretic migration of macromolecules in a spatial manner.

It is an object of the present invention to obviate or mitigate at least some the above deficiencies.

SUMMARY OF THE INVENTION

In one aspect, there is provided a method for distributing power in an electrophoresis system from a power supply to each channel of an interfaced cassette connected to a pedestal located on the electrophoresis system, the method comprising: receiving a power signal from the power supply at the pedestal; receiving at least one externally generated control signal; and, modulating the power signal at a processor electrically coupled to the pedestal in dependence upon the control signal to generate a modulated power signal defined for each said cassette channel of the pedestal.

In another aspect, there is provided an electrophoresis system for distributing power to an interfaced cassette, the system comprising: a robotic workstation for receiving at least one control signal from an external computing device for controlling electrophoresis operation thereon, the robotic workstation comprising an on-board power module; a modular pedestal electrically coupled and received on the robotic workstation, the pedestal for receiving the interfaced cassette, the pedestal comprising a processor and a memory, the processor configured to: receive a power signal from the power module; receive said at least one control signal designated for the interfaced cassette of the pedestal; and, modulate the power signal in dependence upon the control signal to generate a modulated power signal defined for each said cassette channel of the pedestal.

BRIEF DESCRIPTION OF THE DRAWINGS

The features of the invention will become more apparent in the following detailed description in which reference is made to the appended drawings wherein.

DETAILED DESCRIPTION OF THE INVENTION

Figure 1:
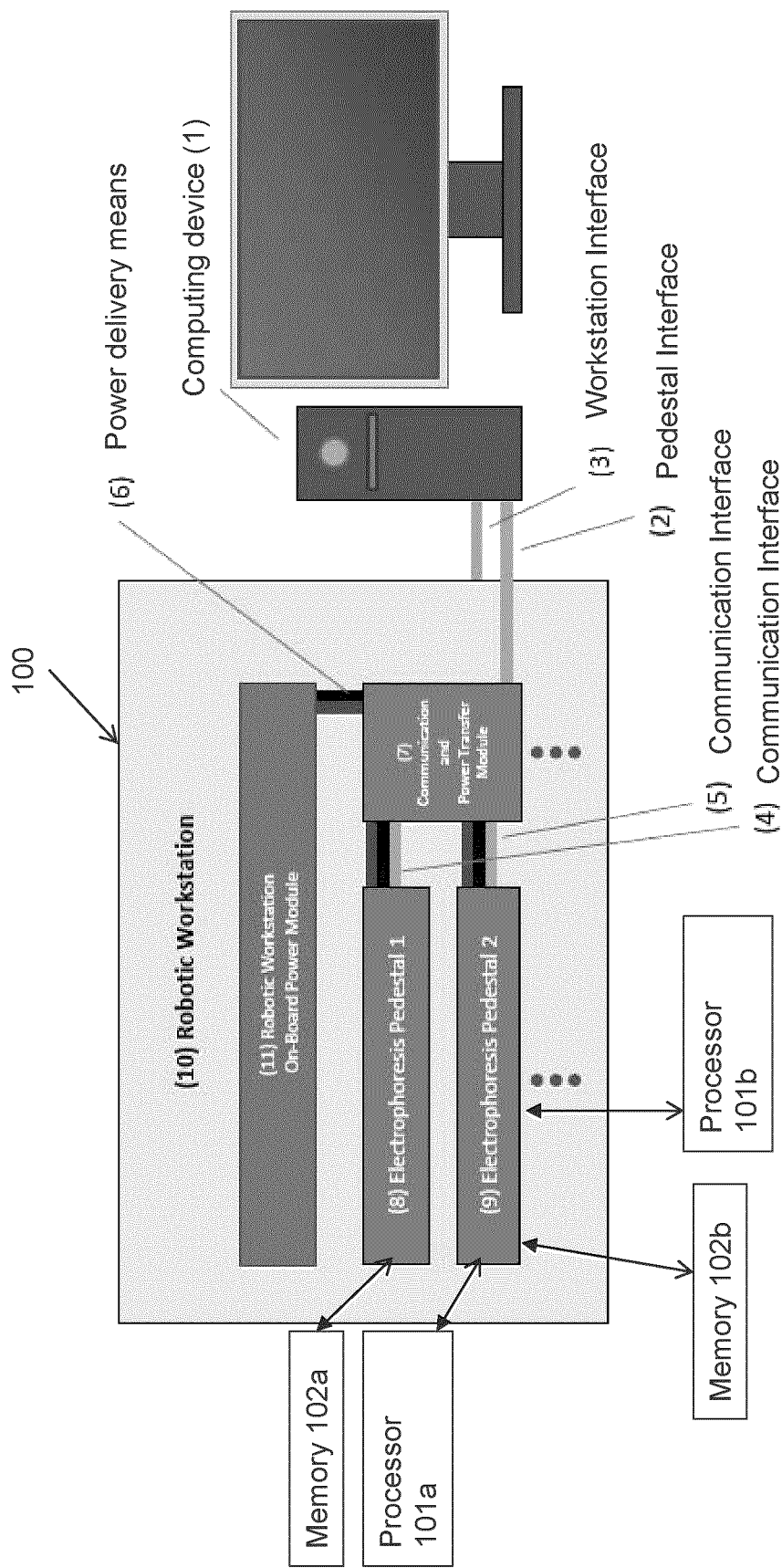
FIG. 1 is schematic view of one embodiment of an electrophoresis system comprising a robotic workstation coupled to a computing device for communication therewith, as provided herein.

For convenience, like reference numerals in the description refer to like structures in the drawings. In addition, numerous specific details are set forth in order to provide a thorough understanding of the example embodiments described herein. However, it will be understood by those of ordinary skill in the art that the example embodiments described herein may be practiced without these specific details. In other instances, well-known methods, procedures and components have not been described in detail so as not to obscure the example embodiments described herein. Also, the description is not to be considered as limiting the scope of the example embodiments described herein.

Electrophoresis System

Referring to FIGS. 1-7, in the illustrated embodiments, an electrophoresis system for use with a computing device 1 is illustrated generally by numeral 100. The electrophoresis system 100 comprises a first workstation interface 3 for communicating between the computing device 1 and a robotic workstation 10 (e.g. electrical and digital communication). A pedestal interface 2 is further provided for facilitating communication (e.g. electrical and digital communication) between at least one electrophoresis pedestal (8, 9) disposed on the robotic workstation 10 and the computing device 1. Each pedestal 8, 9 comprises a respectively associated processor 101a, 101b and memory 102a, 102b. The processors 101a, 101b is also referred generally to as processor 101 herein. Furthermore, the memory 102a, 102b is referred generally to as memory 102 herein.

As will be defined further below, each processor 101a, 10b is associated with a pedestal 8, 9 and electrically coupled thereto. The processor 101 is configured to receive one or more control signals from an external source (e.g. a computing device 1), decode or translate the control signal received from the external source (e.g. computing device 1 via the communication module 7) and manipulate the power received from the on-board power module 11 (e.g. via the communication module 7) to pre-defined levels (e.g. via modulation) according to the control signal. In this manner, as will be described, each of the channels within a cassette received at a pedestal (8, 9) can be configured to receive a unique power level as controlled by the local processor 101a or 101b. Referring to FIG. 1, the electrophoresis system 100 is configured to allow bi-directional communication between each processor 101 associated with a pedestal (8, 9), the communication and power transfer module 7 and subsequently, the external computing device 1.

In one embodiment, each of the computing device 1 (e.g. a desktop, a computer, a mobile device, a tablet, a laptop, etc.) and the robotic workstation 10, comprises a processor, a memory and a communication means to communicate therebetween. Although not shown, various user input devices (e.g. touch screen, roller ball, optical mouse, buttons, keyboard, microphone, etc.) coupled to the computing device 1 can be used to facilitate interaction between the user, the computing device 1, the robotic workstation 10 and/or the at least one pedestal (8, 9).

In one embodiment, the robotic workstation 10 further comprises a communication and power transfer module 7 for communicating with the pedestal interface 2 and receiving power therefrom. The communication and power transfer module 7 is further configured for transferring power and directing control of said at least one pedestal (8, 9). Referring to FIG. 1, the robotic workstation 10 further comprises an on-board power module 11 to provide power for all native workstation (10) operation, as well as third-party integration components. The on-board power module 11 is further configured for generating power locally on the workstation 10 and for directing said power to the workstation 10 and/or pedestals 8, 9 depending upon control signals further provided directly from the communication and power transfer module 7.

Referring to the embodiment provided in FIG. 1, the electrophoresis system 100 comprises a modular electrophoresis power supply also referred to as the on-board power module 11 herein, that physically (mechanically and electrically) interfaces with the robotic liquid handling workstation 10 and is disposed thereon for electrical communication therewith. The power module 11 is a component of the workstation 10.

The power transferred to each pedestal (8, 9) from the power module 11 can be electronically controlled at the pedestal (8, 9) via the associated processor 101 (e.g. 101a, 101b). For example, the processor 101 can be configured to control the power in dependence upon control signals received from the computing device 1, from user interface input received via a user interface in communication with the processor 101, and via pre-defined instructions stored on the memory 102) for controlling the power delivered to the at least one pedestal (8, 9)). The processor 101 may be configured to access the memory 102 to execute instructions stored thereon, wherein the instructions may be pre-defined depending on various parameters (e.g. type of macromolecules, type of medium, desired charge and/or size) in order to control the voltage or power provided by the processor 101 to the at least one pedestal (8,9).

It will be appreciated that any module, component, or system exemplified herein that executes instructions or operations may be implemented using one or more processor devices, although not necessarily shown. It will be appreciated that any module, component, or system exemplified herein that executes instructions or operations may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data, except transitory propagating signals per se. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any application, system or module herein described may be implemented using computer readable/executable or instructions or operations that may be stored or otherwise held by such computer readable media.

Pedestals

Figure 2:
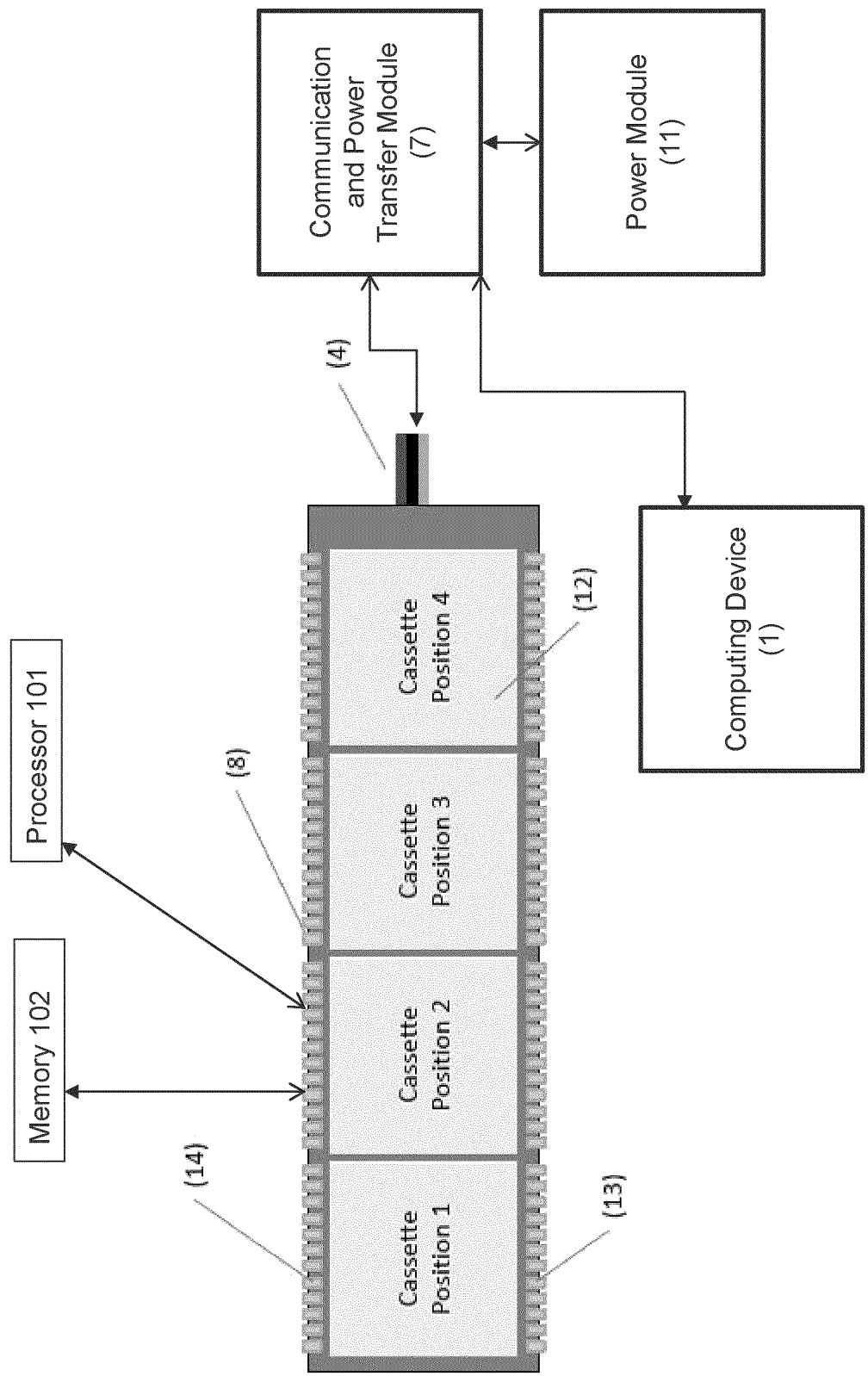
FIG. 2 is a top view of a pedestal of the electrophoresis system of FIG. 1.
Figure 3:
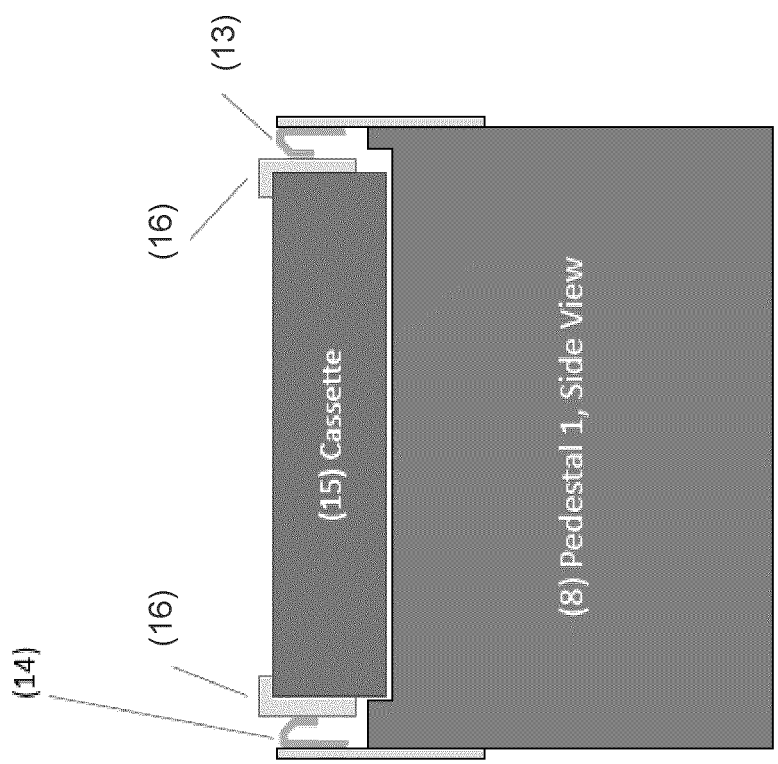
FIG. 3 is a schematic view illustrating connectivity between the pedestal of FIG. 2 and a plurality of openings for receiving cassettes thereon.
Figure 4:
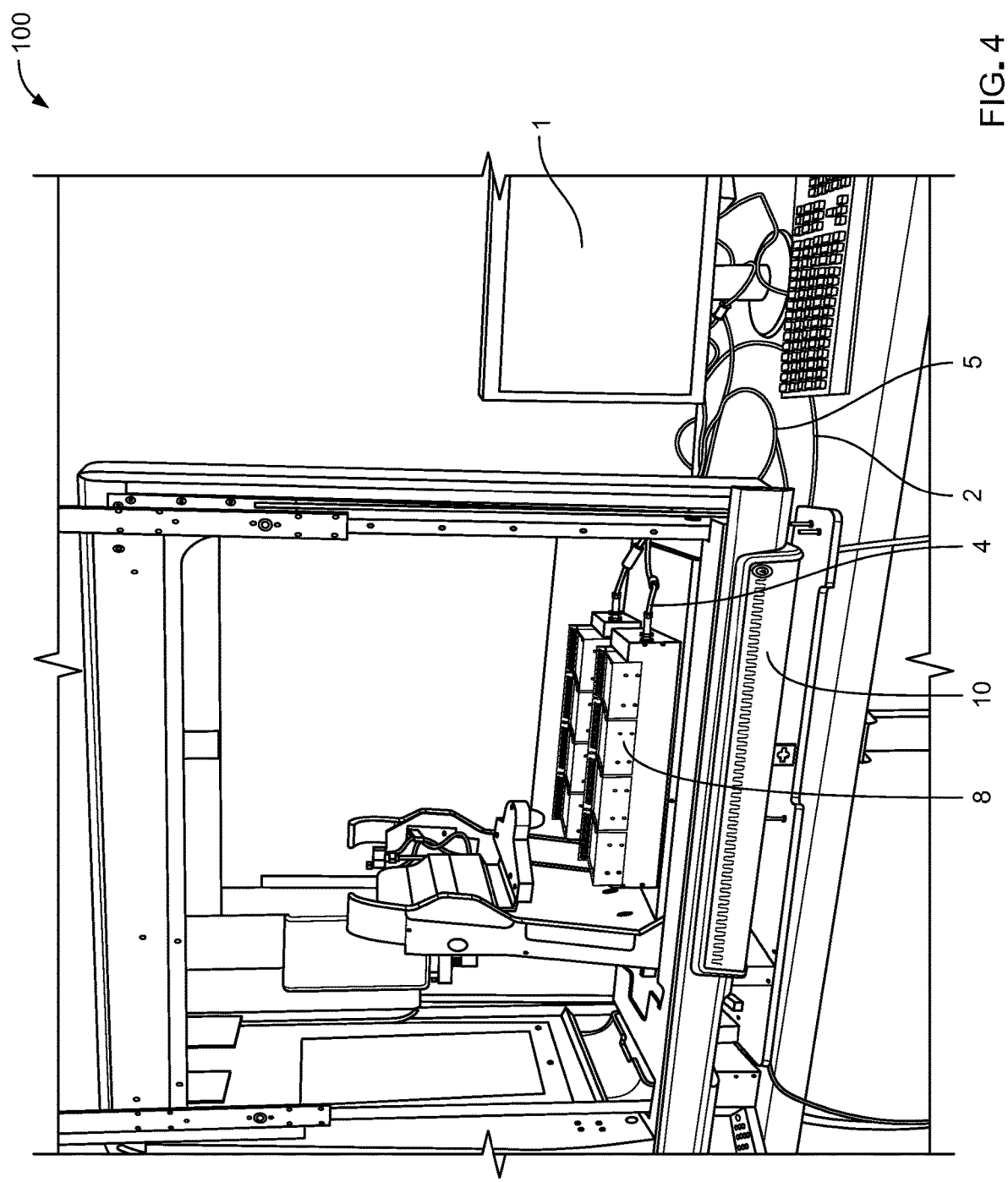
FIG. 4 is a perspective view of one embodiment of an electrophoresis system comprising a robotic workstation coupled to a computing device, as provided herein.

Referring to FIGS. 1-7, the electrophoresis system 100 comprises at least one pedestal (8, 9) mounted in mechanical and electric connection with the robotic workstation 10. In one embodiment, each electrophoresis pedestal (8, 9) is configured to provide a base for receiving at least one electrophoresis cassette ("cassette") and adapted for use in the robotic liquid handling workstation 10. Each cassette comprises one or more channels comprising a gel matrix in which one or more samples may be run. Referring to FIGS. 2 and 3, there is shown a plurality of cassette cavities 12, for receiving a cassette.

Referring to the embodiments illustrated in FIGS. 2 and 3, each pedestal (8, 9) is configured to provide an operational platform comprising a plurality of cavities 12 for receiving at least one cassette 15 (e.g. as shown in FIG. 3). In operation, when a cassette 15 is provided in a cavity 12, a liquid transferring means, such as a remotely operated arm including at least one liquid transferring pipette, can functionally interface with at least one liquid holding reservoir of the cassette 15.

Referring to the embodiment illustrated in FIG. 1, said at least one pedestal (8, 9) is configured to receive power from a local power supply (e.g. the on-board power module 11 disposed on the robotic workstation 10 configured for handling liquids). This is advantageous as it allows the robotic workstation and the pedestals 8, 9 to operate independently on the robotic workstation 10 such that there is no need for an external power supply. Additionally, in a preferred embodiment illustrated in FIG. 1, there is provided a local communication and power transfer module 7. The communication and power transfer module 7 is configured to convert and transfer power as received from the power module 11 to the pedestals thereby acting as a distribution hub.

In one embodiment (not illustrated), the power transfer module 7 is not present on the robotic workstation 10 such that each pedestal 8, 9 is directly connected to the on-board power supply 11, thereby receiving power directly therefrom.

Referring to the embodiments illustrated in FIGS. 2 and 3, said at least one pedestal (8, 9) is configured to accept at least one electrophoresis cassette (e.g. 15) wherein each cassette 15 comprises a gel matrix and a running buffer (i.e., a "buffer" or a "buffer solution") configured for a particular application. Referring to the embodiments illustrated in FIGS. 1-3, the power module 11 is configured to distribute power to each channel of an interfaced cassette (e.g. cassette 15). In one aspect, a power delivery means 6 such as a plurality of electrical conducting cables, or leads deliver power from an internal power supply 11 to the electrophoresis channel(s) present in a cassette located on a pedestal 8, 9.

Figure 7:
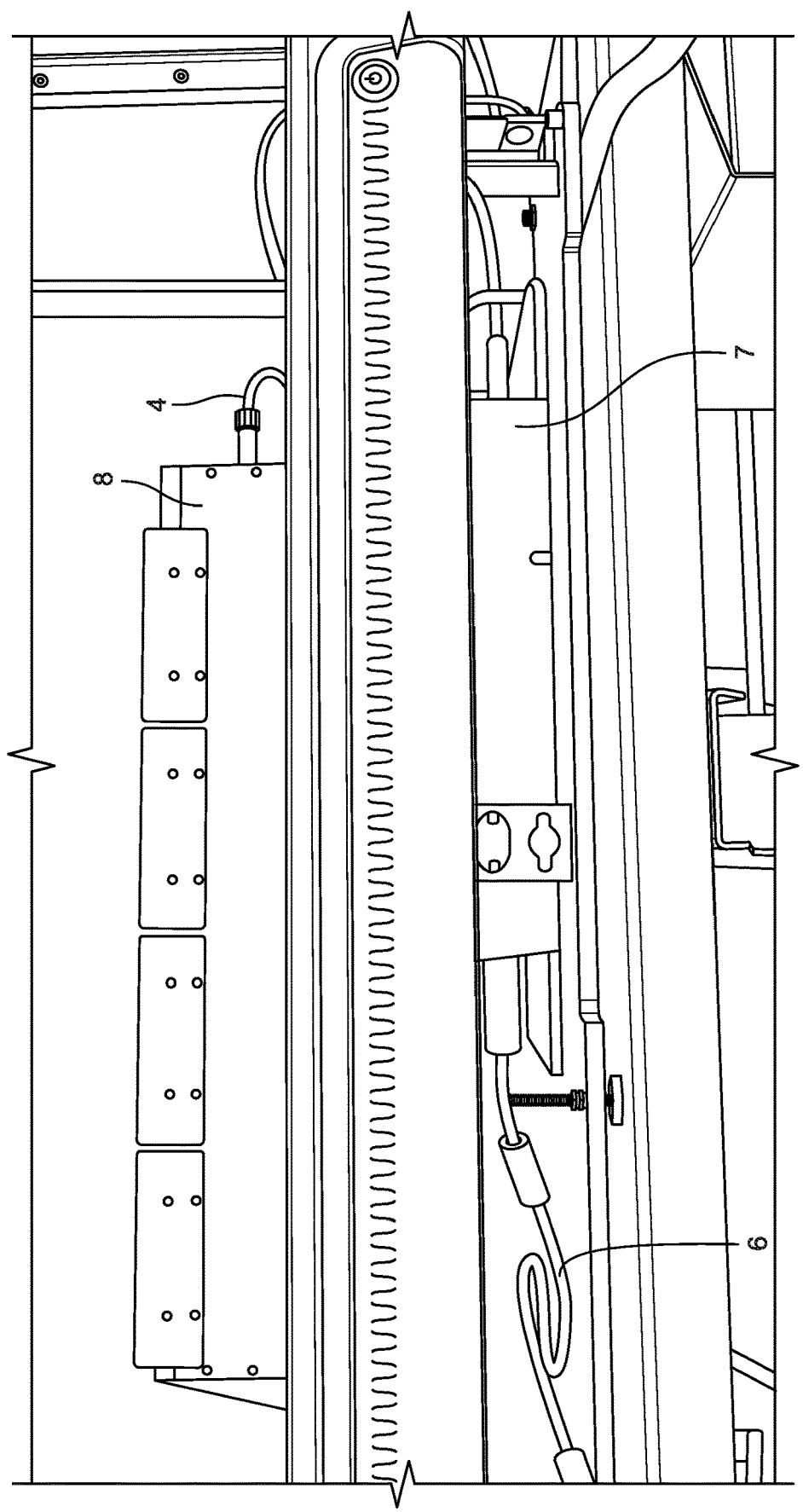
FIG. 7 is a side view of a portion of the electrophoresis system of FIG. 4, illustrating the connectivity between the robotic workstation of FIG. 4 and an onboard communication and power transfer module.

Preferably, as illustrated in FIGS. 1 and 7, when power is to be distributed to a plurality of channels, the pedestal 8, 9 locally controls (e.g. via the respective processor 101a, 101b) and adjusts the power received from the module 7 and/or module 11 as desired. As will be defined below, the processor 101 is configured to perform power modulation on the power signal in dependence upon instructions stored in the memory 102 and/or control signals received from the computing device 1. Thus, the communication and power transfer module 7 acts as a hub to provide power from module 11 and communication (e.g. control signals) from the computing device 1. In another embodiment, where the communication and power transfer module 7 is not present, the pedestal (8, 9) is configured to receive power directly from the module 11.

Positioning of a Cassette in a Pedestal

Referring to the embodiments illustrated in FIGS. 1 to 3, biasing means 13 and 14 comprising spring tabs provide a mechanical restraining means for positioning the cassette 15 directly within a cavity of the pedestal 8. The biasing means 13 and 14 position the respective cassette 15 in a known X and Y coordinate. For example, the spring contacts provide a nesting force for minimally constraining the cassette 15 within the cavity 12. In this aspect, the biasing means 13 and 14 (e.g. spring tabs) are configured to provide direct contact with the electrodes 16 of the cassette 15, thereby providing electrical connectivity and providing a locating/alignment force for positioning the cassette 15.

The biasing means 13 and 14 thus provide an accurate locating reference between the deck of the robotic workstation 10 and an electrophoresis cassette 15, thereby allowing pipetting of samples by the robot into one or more desired locations in the cassette 15. In one embodiment, the biasing means 13 and 14 provide an unobstructed, reproducible view of the cassette 15 for imaging of electrophoresis.

In another aspect, the biasing means 13 and 14 (e.g. spring tabs) are configured to provide indirect contact with the electrodes 16 of the cassette 15, thereby providing a locating/alignment force for positioning the cassette 15 via a removable component (e.g. a wedge or intermediate bridge).

As used herein, a "wedge" or "removable wedge" is a structure that may be positioned between a pedestal and cassette and functions to position and/or retain the cassette with respect to a desired location in a pedestal. As used herein, a "wedge" refers to any structure that functions as a locating means and a conducting means for passing voltage from the pedestal to cassette embedded electrodes.

Use of a removable component allows disposal and reusability as well as adjustable alignment to ensure correct orientation relative to the cassette 15. In this manner, insertion of a removable component (e.g., wedge or intermediate bridge) activates the alignment/clamping/locating force discussed above. Accordingly, this allows a zero-force placement and removal of the cassette before the removable components are inserted and after they are removed, respectively. Furthermore, insertion of the removable component also automatically secures the electrical connection between the cassette 15 and the respective pedestal 8 such that no further clamping, clipping, or switching is required. Accordingly, the design of the removable components is advantageous as they are void of fasteners and can be sterilized through bleaching without risk of corrosion, allowing the removable components to be reused if desired such that these removable components can be either entirely removable and independent from the unit, or they could be permanently, or semi-permanently, connected to the unit (i.e. on a hinge-type system).

In one embodiment, to ensure proper registry between a cassette and a liquid transferring means (e.g., a liquid handling robot), the pedestal preferably comprises at least one registration feature that is complementary to a feature present on cassettes intended for use with the pedestal and robotic liquid handling workstation, as provided herein. In operation, when the pedestal 8, 9 is mounted to the robotic workstation 10, substantially identical cassettes will consistently interface with the liquid transferring means when registration features of the cassettes are aligned with those of the pedestal. In embodiments where removable components, such as wedges and/or bridge conductors, are used, the registration feature(s) may be keyed to a complementary feature thereon, which then comprises a feature complementary to a registration feature associated with the pedestal. For example, the wedge and/or bridge conductor may have polarity, thereby ensuring proper insertion of the removable feature between the pedestal and cassette.

Direct Electrical Coupling of a Cassette and Pedestal

The pedestals (8, 9) derive electrical power from the workstation 10 as locally generated by the power module 11 and/or transferred from the computing device 1 via the transfer module 7. The pedestals 8, 9 comprise at least one cassette electrical interface for supplying independently controllable voltage potential ("power") to at least one cassette coupled therewith, and at least one cassette physical interface for ensuring proper positioning of at least one cassette 15 thereon, as illustrated in FIG. 3. In one embodiment, the pedestal may be directly electrically coupled with one or more cassettes.

Referring to FIGS. 2 and 3, a pedestal 8, is configured for receiving at least one cassette 15 within at least one cassette cavity 12. Each cassette is removably retained in the pedestal 8, by a first and second biasing means 13 and 14. In one preferred embodiment, the first and second biasing means are resilient (i.e., have a restorative bias), thereby accommodating introduction and/or removal of a cassette into and from the pedestal and optionally introduction and/or removal of a wedge or intermediate bridge, which may be used for indirect electrical conduction via a conductive plug 20 (illustrated in FIG. 9) and/or locating bias, as discussed further below.

In one embodiment, the first and second biasing means are electrically conductive contact elements that may also be referred to herein as "pedestal contacts". In one embodiment, the first biasing means 13 can include spring contacts or pin contacts located on a first side of the pedestal 8 (e.g. front side) and the second biasing means 14 can include spring contacts or pin contacts located on a second opposing side of the pedestal 8 (e.g. a rear side). In one embodiment, the first and second biasing means may be exposed, such as, for example, first and second biasing means 13 and 14. In one embodiment, the first and second biasing means may be shielded, such as, for example, a conductive slot or shielded blade. In one embodiment, first and second biasing means are provided for each channel in a cassette. In such embodiments, the "pair" of biasing means (also referred to as pedestal contacts) may be associated with a single electrical interface on the cassette (e.g., electrode 16) or each biasing means may be associated with distinct cassette electrical interfaces.

Referring to FIG. 3, the biasing means 13 and 14 preferably engage an electrical contact on the cassette 15 (e.g. electrodes 16 located on the cassette 15). In one aspect, the electrodes 16 are removable (e.g. not embedded) and configured to engage the biasing means 13 and 14 respectively. In this aspect, the biasing means 13 and 14 (e.g. spring tabs) are configured to provide direct contact with said electrodes 16, for providing both electrical connectivity and providing a locating/alignment force for positioning the cassette 15.

Electrical Coupling of a Cassette and Pedestal

In one embodiment, the pedestal provided herein may be indirectly electrically coupled with one or more cassette, such as, for example, by way of a conducting wedge or an intermediate bridge conductor comprising a conductor wedge, as described further below.

In one embodiment, cassettes without embedded electrodes are inserted into the pedestal 8 such that an electrical connection is generated between the spring tabs 13, 14 and the cassette 15 via a removable conductor. In this aspect, the biasing means 13 and 14 (e.g. spring tabs) are configured to provide contact with said removable conductor.

As used herein, a "wedge" refers to any structure that functions as a removable cassette positioning and/or retaining aid and as part of an electrical conductor between a pedestal and a cassette. Wedges comprise a pedestal electrical interface, which includes at least one electrically conductive contact element ("wedge contact"). Other examples of a removable conductor include, but are not limited to removable electrodes 16, and intermediate bridge conductors comprising a wedge.

A removable bridge conductor, in addition to a pedestal, may be provided for use with cassettes lacking integrated electrical pathways (e.g., integral electrodes). In one preferred embodiment, a bridge conductor comprises a pedestal electrical interface, which has at least one pedestal contact, and a channel immersion interface, a pair of which is usually associated with each channel in a cassette. As the names imply, said at least one pedestal contact of the pedestal electrical interface couples with at least one pedestal contact of the pedestal mounted cassette electrical interface, and delivers power from the pedestal contact to the channel immersion interface, which is exposed to a fluid such as the buffer solution when at least a portion of the bridge conductor has been inserted into a cassette. The pedestal electrical interface of the bridge conductor embodiments preferably comprises a wedge, which preferably includes the aforementioned at least one pedestal contact.

In one embodiment, two bridge conductors are provided, one for each end of a cassette. In one embodiment, a single bridge conductor may be used as long as the described functionality of channel power distribution is retained. Presuming that the pedestal electrical interface, which may include a wedge, has a sectional thickness 90 (see FIGS. 9 and 10) greater than the distance between a nominal, uncompressed pedestal mounted pedestal contact and the cassette end, but less than the distance between a fully compressed pedestal contact and the cassette end, and when the pedestal electrical interface of the bridge conductor is inserted into such space, the bridge conductor pedestal electrical interface will cause the pedestal mounted pedestal contact to compress, thereby electrically coupling the two components and establishing the previously described locating bias between the pedestal and the cassette. In combination with this insertion, the immersion interface preferably transits an opening in the cassette so that it may present to a fluid reservoir of a channel, which may contain, for example, a buffer solution.

Figure 8:
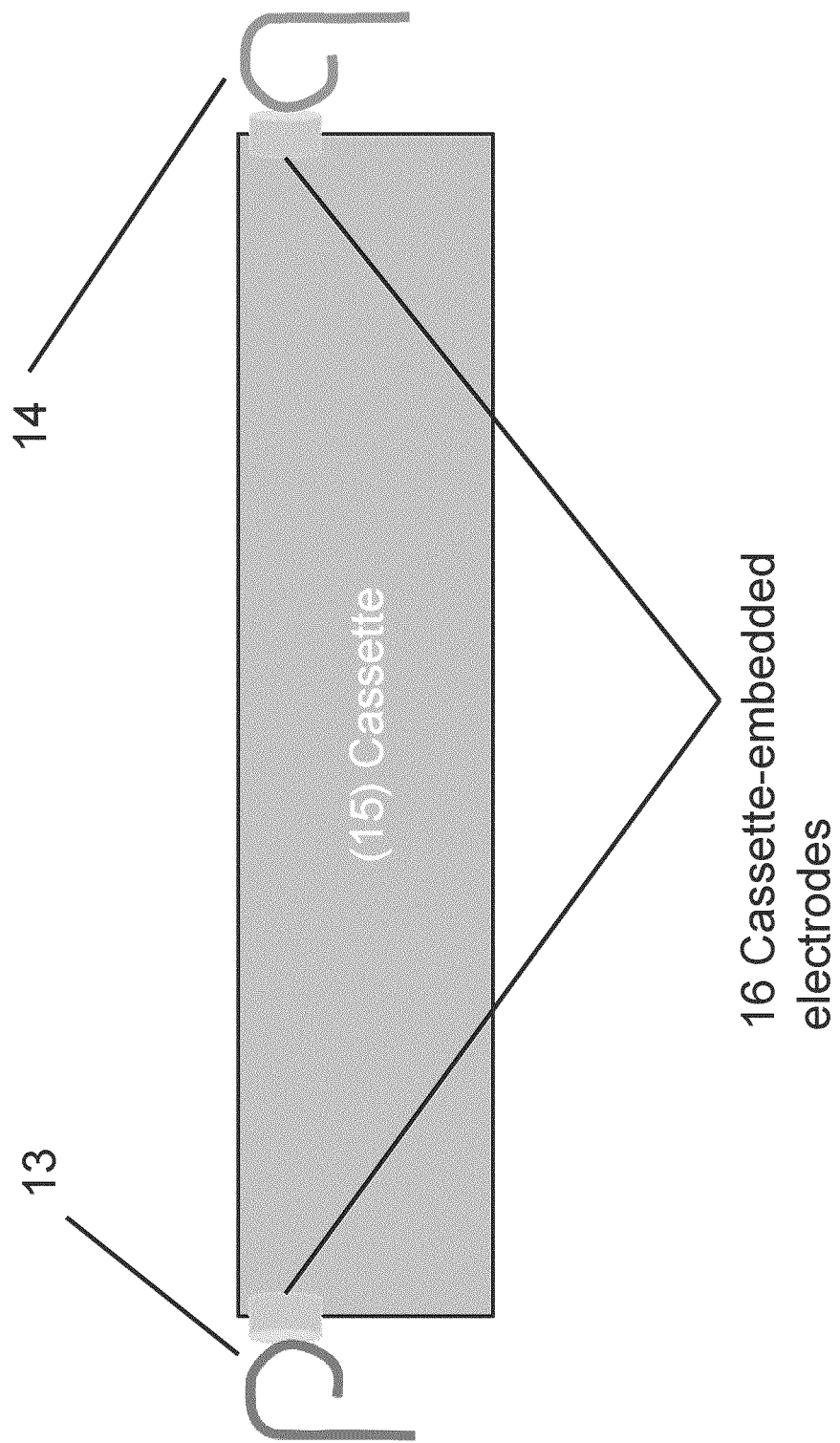
FIG. 8 is a schematic view illustrating direct electrical coupling of a cassette.

Referring to FIG. 8, there is illustrated a schematic of a direct electrical connection and positioning of the cassette 15 that is achieved with direct contact between the cassette-embedded electrodes 16 and the spring contacts 13, 14, in accordance with one embodiment. Note that, in the present embodiment spring tab contacts 13, and 14 are attached to the electrophoresis pedestal (e.g. 8) as in FIG. 3. In this embodiment, no removable component (i.e. wedge or bridge) are required.

Figure 9:
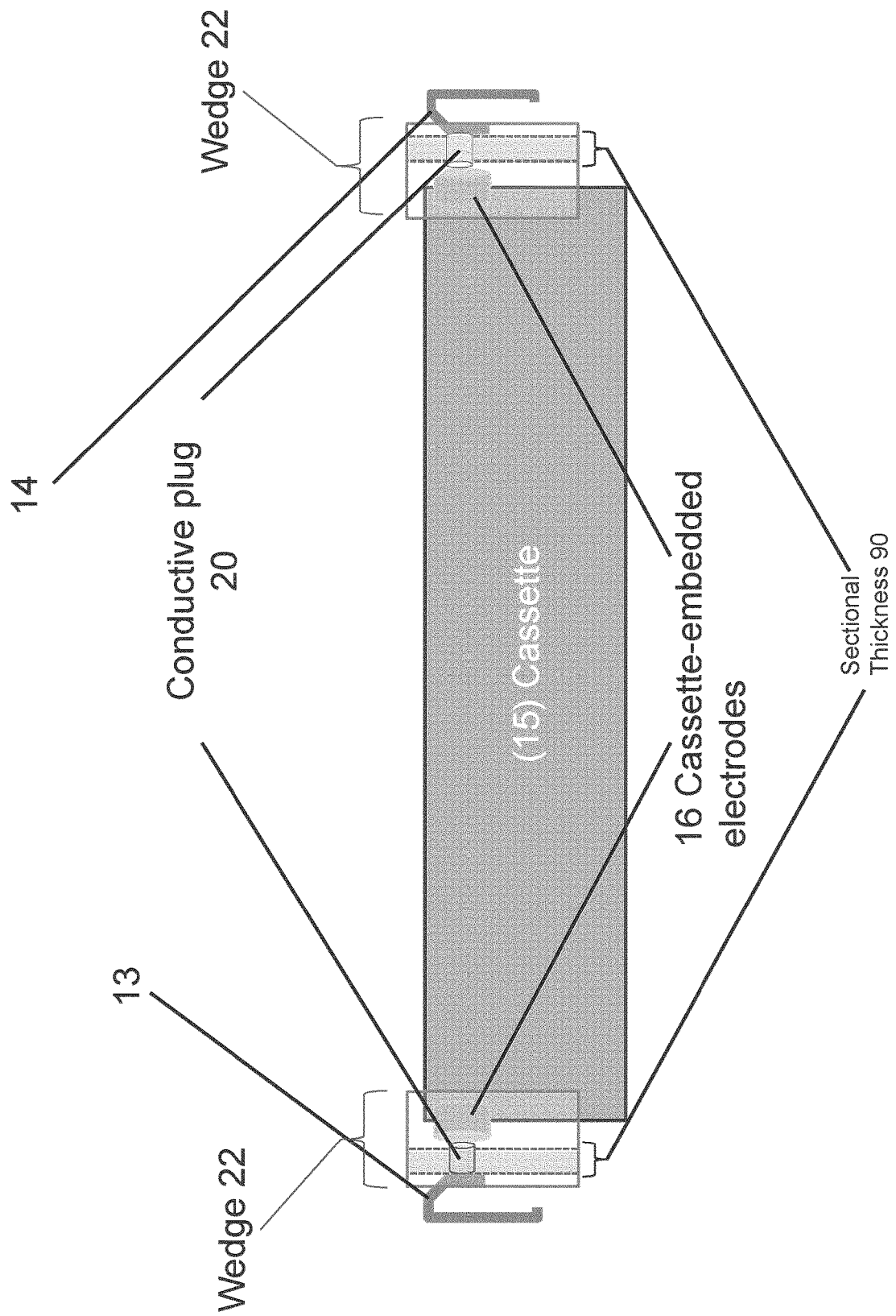
FIG. 9 is a schematic view illustrating indirect electrical connection between spring tabs and the cassette embedded electrodes.

Referring to FIG. 9, there is illustrated a schematic of indirect electrical connection between the spring tabs 13, 14 and the cassette embedded electrodes 16 that is achieved with the use of a removable wedge 22, which also acts to locate the cassette 15, in accordance with one embodiment. In the present embodiment, the spring tab contacts 13, 14 are configured to be attached to the electrophoresis pedestal as in FIG. 3.

Figure 10:
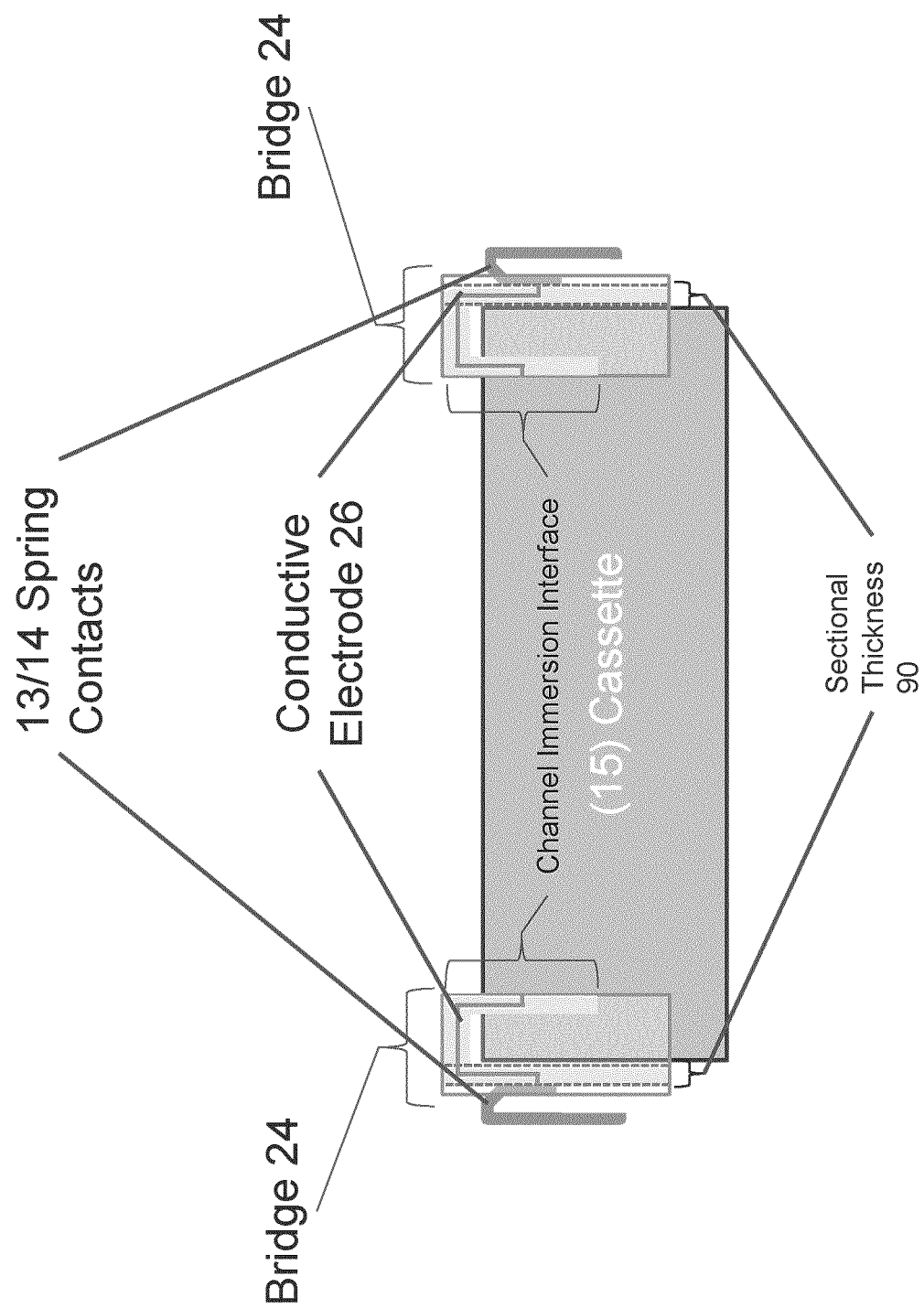
FIG. 10 is a schematic view illustrating indirect coupling between the spring tabs and the cassette.

Referring to FIG. 10, there is illustrated an indirect electrical connection between the spring tabs 13, 14 and the cassette 15 that is achieved with the use of a removable bridge 24, which also acts to locate the cassette 15, in accordance with one embodiment. In this embodiment, the cassette 15 does not require its own electrodes as the bridge completes the electrical connection to the cassette 15 via the conductive electrode 26, which mates with the cassette through the channel immersion interface (illustrated in FIG. 11). In the present embodiment, the spring tab contacts 13, 14 are configured to be attached to the electrophoresis pedestal (e.g. 8) as in FIG. 3.

Figure 11A:
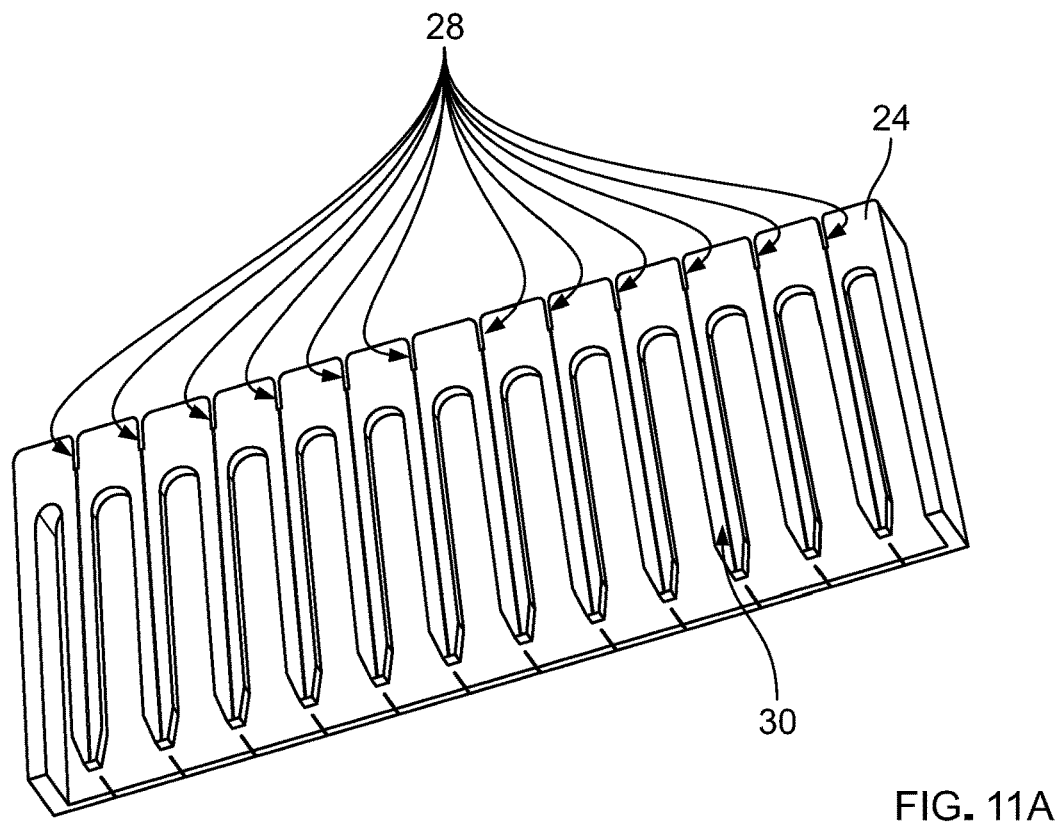
FIG. 11(a) illustrates a top side view and FIG. 11(b) illustrates a bottom side of a cassette positioning backplate of a bridge.
Figure 11B:
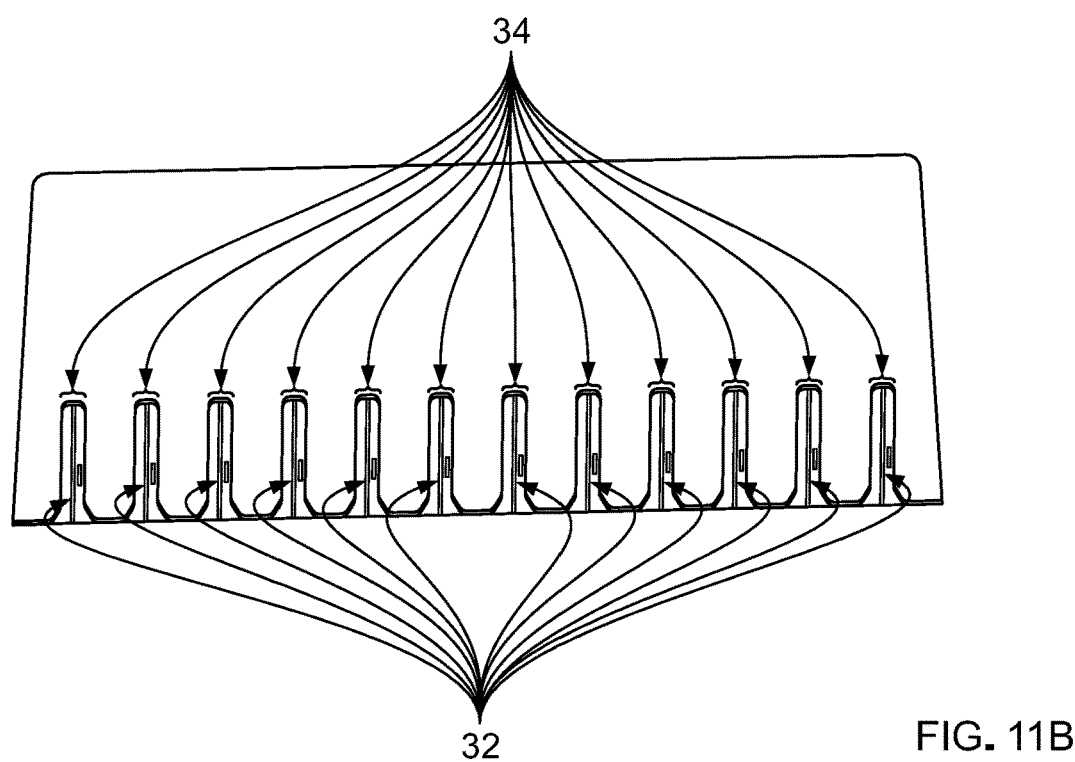

FIG. 11(a) illustrates a top side view and FIG. 11(b) illustrates a bottom side view of a cassette positioning backplate of a bridge 24. The bridge 24 comprises channel immersion interfaces 28 and a cassette positioning backplate 30 for contacting a cassette end and helping to locate the cassette. FIG. 11(b) illustrates the pedestal/electrical interfaces 34 for interfacing with a pedestal (e.g. 8) and wedge contacts 32.

Figure 12B:
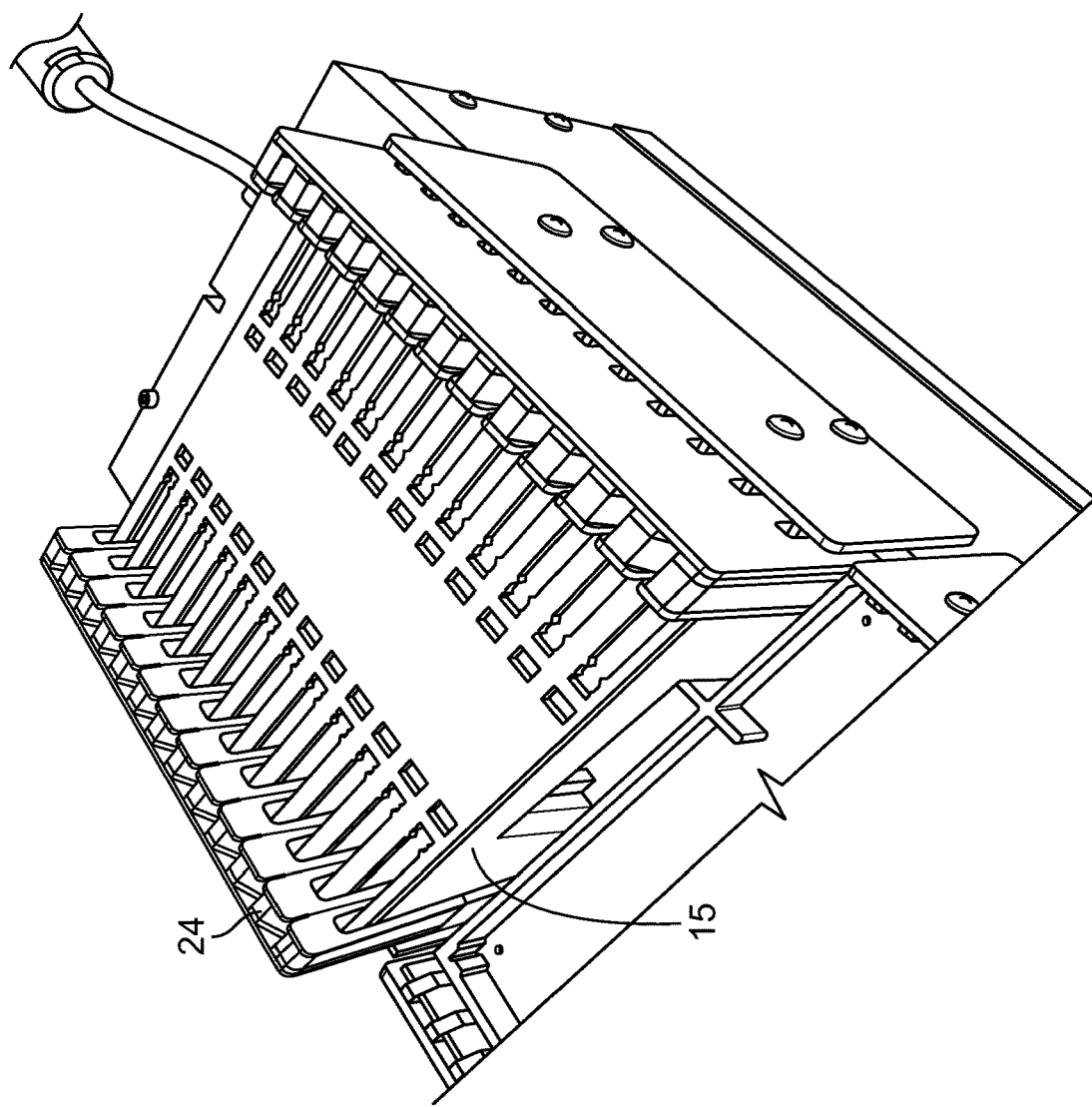
FIG. 12(b) illustrates a top view of the cassette and the bridge.
Figure 12A:
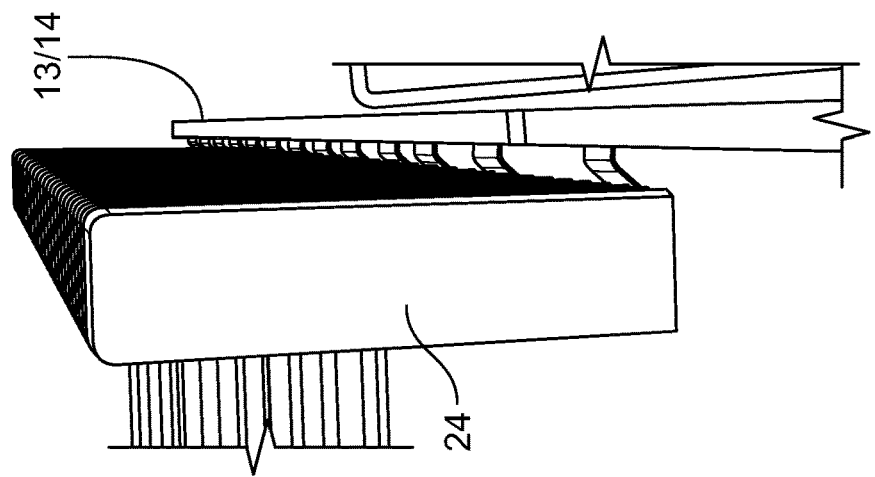
FIG. 12(a) illustrates an end view of the bridge and the cassette.

FIG. 12(a) illustrates a side view of a bridge where the sectional thickness 90 (e.g. shown in FIGS. 9 and 10) is greater than the distance between a nominal, uncompressed pedestal mounted pedestal contact and the cassette end, but less than the distance between a fully compressed pedestal contact and the cassette end. FIG. 12(b) illustrates a top view of a bridge/wedge and the channels of the cassette illustrating the connectivity therebetween.

Connectivity Between Pedestals

Figure 5:
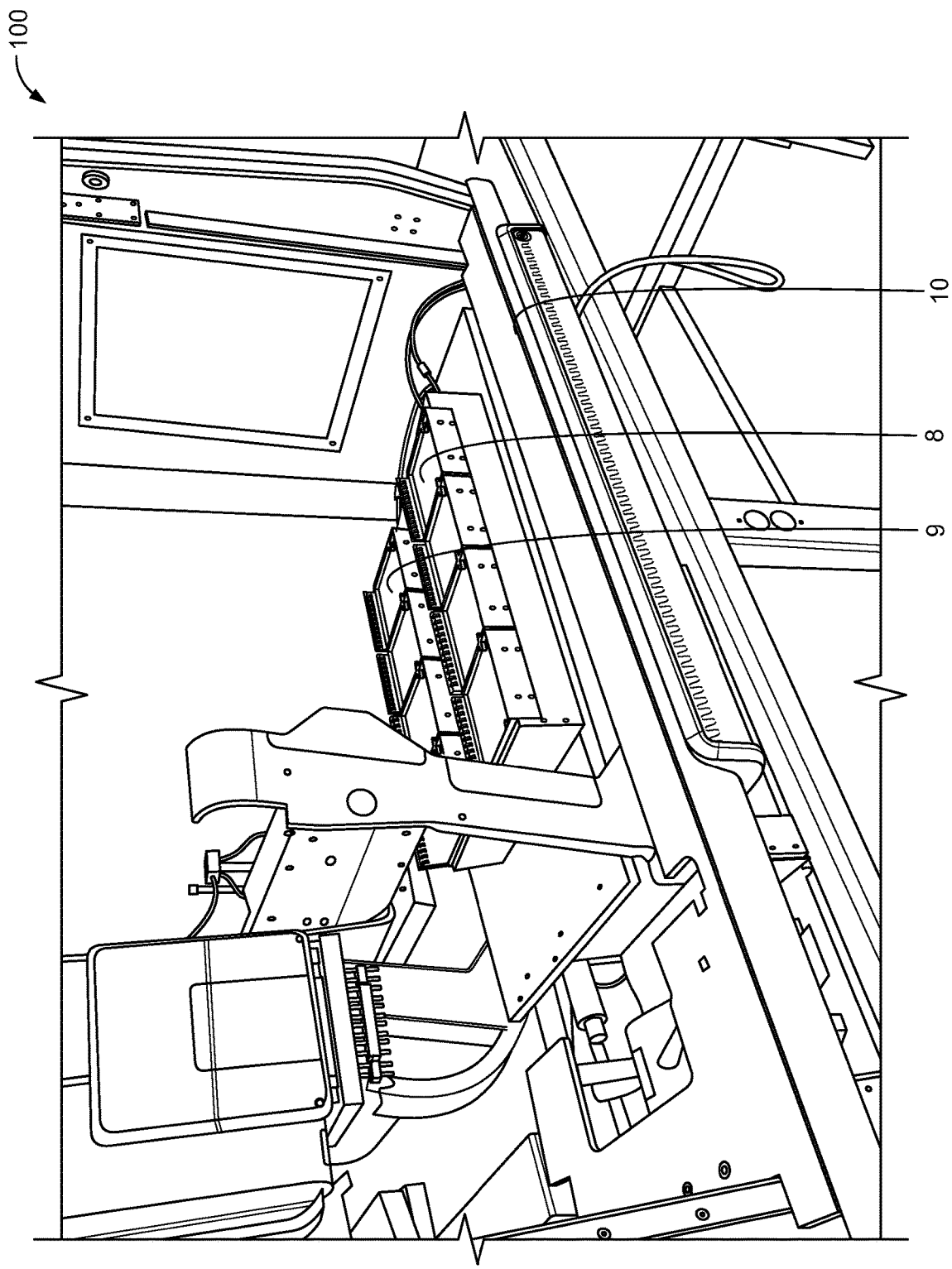
FIG. 5 is a side view of the electrophoresis system of FIG. 4 illustrates a plurality of pedestals disposed on the robotic workstation.
Figure 6:
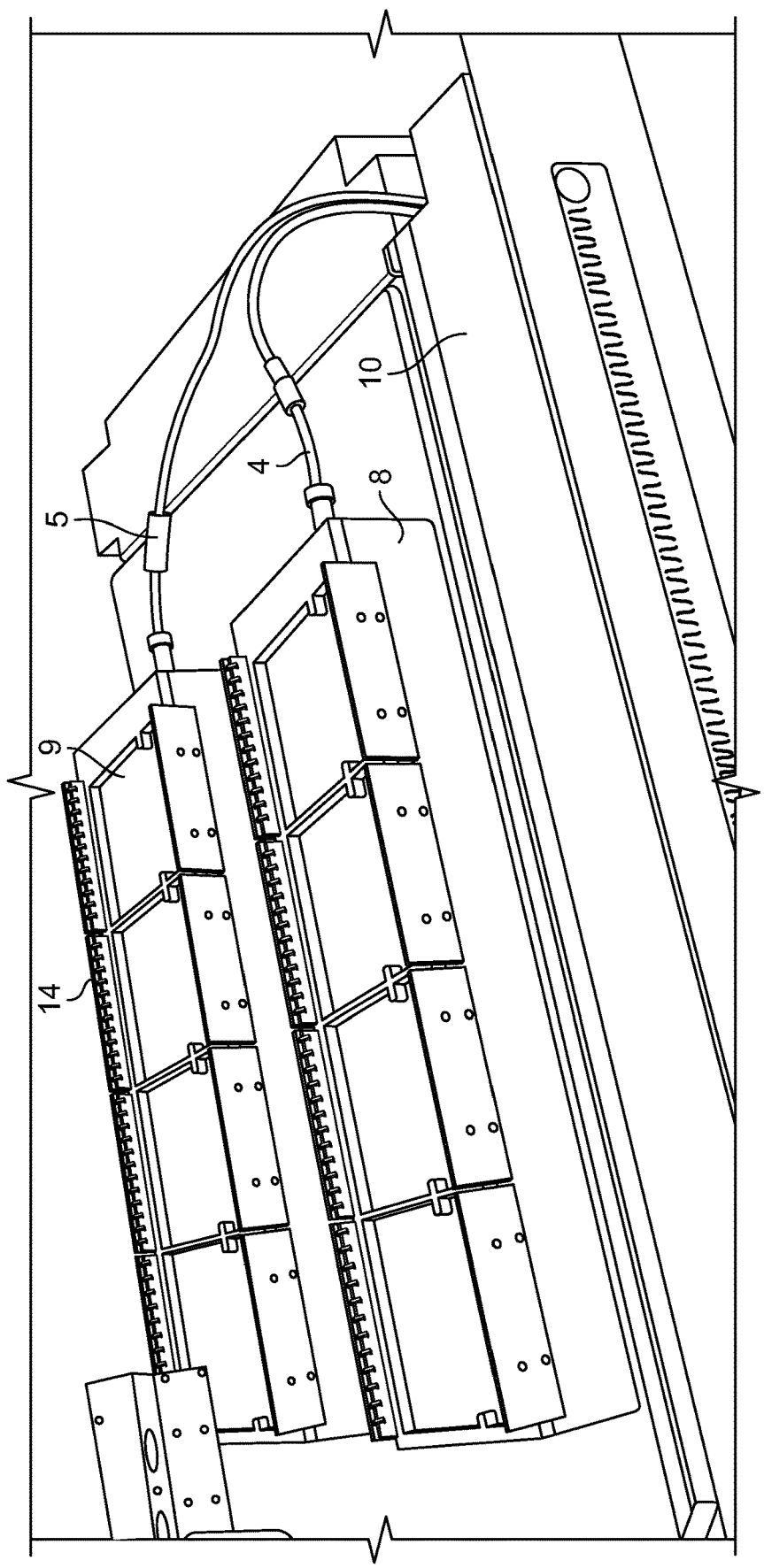
FIG. 6 is a side view of a portion of the electrophoresis system of FIG. 4 illustrating the coupling between the plurality of pedestals in FIG. 5.

As illustrated in FIGS. 5-6, in one embodiment, the electrophoresis system 100 comprises a plurality of pedestals (8, 9), which are operatively mechanically coupled to one another to allow for improved scaling opportunities. For example, a plurality of pedestals 8, and 9 can be connected in series (daisy chained) to allow for expanded capacity while maintaining a single control point within the workstation 10.

Control Module

Referring to FIG. 1 there is provided an on-board processing system (e.g. as provided by the processors 101) in the electrophoresis pedestal 8, 9 for controlling the process and parameters for electrophoresis. This is advantageous as the pedestal with integrated processing capability (e.g. processors 101a, 101b) avoids disadvantages from an external PC including numerous cables (e.g. high voltage) that run between the PC to the electrophoresis pedestal.

In one aspect, the electrophoresis system 100 is configured to receive and interpret a standardized command set for external control (e.g. via the computing device 1) of the robotic workstation 10 and the pedestal (8, 9). The command set can be interpreted by each pedestal's 8, 9 respective processor 101a, 101b for control of the pedestal 8, 9.

The bi-directional communication between the pedestal 8, 9 and a controlling device (e.g. communication and power transfer module 7 in communication with processor 101), allows controlling the respective pedestal 8, 9 and/or obtaining process measurements. This allows for collecting of data throughout the run on a channel-wise basis.

Referring to FIG. 1, it is illustrated that the communication and power transfer module 7 communicates to each pedestal 8, and 9 via separate distinct communication interfaces 4 and 5. Preferably, each channel signal is unique, whether electrically discrete or uniquely identifiable by code (address) and/or time division protocols. Additionally, preferred smart switch embodiments provide for the separate operability of communication channels and power delivery means. In this manner, should there by a failure in a power delivery means, for example, control and communications signals can be maintained, thereby allowing for continued control of the pedestal 8 or 9 by the workstation 10.

As defined herein, each processor 101a, 101b in communication with the respective pedestal 8, 9 and module 11 is configured to modify the signal (e.g. power, voltage) as received from the module 11. For example, the processor 101 can be configured to perform: channel-wise, analog voltage control level (including reversing the voltage direction); channel-wise PWM (pulse-width modulation) control; channel-wise duty cycle control (for PWM); channel-wise frequency control (for PWM); channel-wise current feedback—this can provide information about the sample (its ionic strength) and also allows for troubleshooting and error detection. In one example, real-time monitoring of electrical isolation between channels (a 'leaky' cassette with incomplete isolation between two channels could be detected in this way). Accordingly, the processor 101 can be configured to control and automatically adjust electrophoresis parameters in real-time, such that they are not fixed during a given run.

In one aspect, the electrophoresis system 100 is configured to have a built-in illumination for imaging through transparent cassettes. In another aspect, electrophoresis system 100 further comprises built-in cassette identifying mechanism (RFID) that can be integrated on the pedestal 8, 9. For example, the identifying mechanism can help define parameters used during the electrophoresis for a particular cassette as understood by the processor 101.

In one embodiment, for improved safety, the electrophoresis power (e.g. as provided by the module 11) can be deactivated separately from the communication and control power (e.g. as provided by the module 7), allowing the pedestal (8, 9) to maintain communication with the robotic workstation 10.

In one embodiment, the electrophoresis system comprises a built-in visual feedback (e.g. via LEDs) of the activation state (voltage, duty cycles etc . . . ) on a per-channel basis.

In one embodiment, the electrophoresis system comprises water-tight locating depressions for cassettes 15 to contain any spills.

In another embodiment, the processor 101 is configured to execute instructions comprising a timeout feature that stops the electrophoresis process if communication has not been received within a certain time period.

Although the invention has been described with reference to certain specific embodiments, various modifications thereof will be apparent to those skilled in the art without departing from the purpose and scope of the invention as outlined in the claims appended hereto. Any examples provided herein are included solely for the purpose of illustrating the invention and are not intended to limit the invention in any way. Any drawings provided herein are solely for the purpose of illustrating various aspects of the invention and are not intended to be drawn to scale or to limit the invention in any way. The disclosures of all prior art recited herein are incorporated herein by reference in their entirety.

We claim:

1. An electrophoresis system for distributing power to an interfaced cassette comprising a plurality of channels, the system comprising:
   a robotic workstation for receiving at least one control signal from an external computing device for controlling electrophoresis operation thereon, the robotic workstation comprising:
      an arm comprising at least one pipette; and
      an on-board power module;
   a first modular pedestal electrically coupled and received on the robotic workstation, the interfaced cassette being housed within or positioned on the pedestal, the interfaced cassette comprising the plurality of channels, a pair of electrical contacts being associated with each of the plurality of channels, the first modular pedestal including a plurality of electrical conducting cables or wires to distribute an independently controllable power signal from the power module to each channel, the pedestal comprising a processor and a memory, the processor configured to:
receive a power signal from the power module;
receive said at least one control signal designated for the interfaced cassette of the first modular pedestal; and
modulate the power signal in dependence upon the control signal to generate the independently controllable power signal defined for each channel of the interfaced cassette of the first modular pedestal.

2. The system of claim 1, wherein the processor is further configured to modulate the power signal further in dependence upon electrophoresis parameters stored on the memory and associated with each said cassette channel.

3. The system of claim 1, wherein the robotic workstation further comprises at least a second modular pedestal and a power transfer module electrically coupled to the power module, the power transfer module configured for communicating the power signal between the power module and said first modular pedestal and said at least second modular pedestal as a broadcast.

4. The system of claim 1, wherein said control signal is uniquely identifiable for each said cassette channel.

5. The system of claim 4, wherein each said cassette channel is uniquely identifiable by multiplexing.

6. The system of claim 1, wherein modulating the power signal comprises modulating using at least one of: analog voltage control; pulse width modulation; duty cycle control for pulse width modulation; and frequency control for pulse width modulation.

7. The system of claim 1, wherein the processor is further configured to:
i. monitor a current feedback of each said channel; and,
ii. adjust the modulated power signal for each said channel in dependence upon said monitoring.

8. The system of claim 1 further comprising a first power electrical channel for providing the power signal to the pedestal and a second control channel for providing the control signal to the pedestal, the first power electrical channel operating independently of the second control channel.

9. The system of 1, wherein the processor is further configured to:
identify said interfaced cassette comprising an identification tag via an identification means associated with the processor of the pedestal, the identification means selected from an RFID reader, a scanner, and an electronic identification means.

10. An electrophoresis system for distributing power to an interfaced cassette comprising a plurality of channels, the system comprising:
a robotic liquid handling workstation comprising an arm, the arm comprising at least one pipette;
a power module configured to generate a single power signal;
a first modular pedestal received on the robotic liquid handling workstation, the first modular pedestal configured to:
house the interfaced cassette comprising the plurality of channels or
position the interfaced cassette comprising the plurality of channels thereon,
a pair of electrical contacts being associated with each of the plurality of channels, the first modular pedestal including a plurality of electrical conducting cables or wires to distribute an independently controllable power signal from the power module to each channel;
the first modular pedestal comprising a processor configured to:
receive the single power signal from the power module;
receive at least one control signal from an external computing device designated for the interfaced cassette of the first modular pedestal; and
modulate the single power signal in dependence upon the at least one control signal to generate the independently controllable power signal defined for each channel of the interfaced cassette of the first modular pedestal.

11. The system of claim 10, wherein the power module is a component of the robotic liquid handling workstation.

12. The system of claim 10, wherein the first modular pedestal further comprises a memory, and wherein the processor is further configured to modulate the single power signal further in dependence upon electrophoresis parameters stored on the memory and associated with each said cassette channel.

13. The system of claim 10, wherein the robotic workstation further comprises at least a second modular pedestal and a power transfer module electrically coupled to the power module, the power transfer module configured for communicating the single power signal between the power module and said first modular pedestal and said at least second modular pedestal as a broadcast.

14. The system of claim 13, wherein the power transfer module is further configured for communicating the at least one control signal between the external computing device and said first modular pedestal and said at least second modular pedestal as a broadcast.

15. The system of claim 10, wherein said at least one control signal is uniquely identifiable for each said cassette channel.

16. The system of claim 15, wherein each said cassette channel is uniquely identifiable by multiplexing.

17. The system of claim 10, wherein modulating the power signal comprises modulating using at least one of: analog voltage control; pulse width modulation; duty cycle control for pulse width modulation; and frequency control for pulse width modulation.

18. The system of claim 10, wherein the processor is further configured to:
monitor a current feedback of each said channel; and,
adjust the modulated power signal for each said channel in dependence upon said monitoring.

19. The system of claim 10 further comprising a first power electrical channel for providing the power signal to the pedestal and a second control channel for providing the at least one control signal to the pedestal, the first power electrical channel operating independently of the second control channel.

20. The system of claim 10, wherein the processor is further configured to:
identify said interfaced cassette comprising an identification tag via an identification means associated with the processor of the pedestal, the identification means selected from an RFID reader, a scanner, and an electronic identification means.

21. An electrophoresis system for distributing power to an interfaced cassette comprising a plurality of channels, the system comprising:

a robotic liquid handling workstation configured to receive at least one communication signal from an external computing device, the robotic liquid handling workstation comprising:
  a processor configured to communicate with the external computing device;
  a deck;
    an arm comprising at least one liquid-transferring pipette, the arm configured to transfer liquid to and/or from one or more of the plurality of channels of the cassette;
    an on-board power module, configured to generate a single power signal; and
    a communication and power transfer module, configured to receive and broadcast the power signal from the power module, and to receive and broadcast at least one control signal from the external computing device;
at least one modular pedestal coupled and received on the deck of the robotic liquid handling workstation, the at least one modular pedestal configured to:
house the interfaced cassette comprising the plurality of channels or
position the interfaced cassette comprising the plurality of channels thereon,
  a pair of electrical contacts being associated with each of the plurality of channels, the first modular pedestal including a plurality of electrical conducting cables or wires to distribute an independently controllable power signal from the power module to each channel
the at least one modular pedestal comprising a processor and a memory, the processor configured to:
  receive the power signal from the said communication and power transfer module;
  receive the at least one control signal from said communication and power transfer module designated for the interfaced cassette of the at least one modular pedestal; and,
  modulate the power signal in dependence upon the control signal to generate the independently controllable power signal defined for each channel of the interfaced cassette of the at least one modular pedestal,
the at least one modular pedestal further comprising a registration feature complementary to a registration feature on the cassette to allow the robotic liquid handling workstation to transfer liquid to and/or from one or more of the plurality of channels of the interfaced cassette.

* * * * *